United States Patent
Venugopal et al.

(10) Patent No.: US 11,617,200 B2
(45) Date of Patent: Mar. 28, 2023

(54) MIXED SFN AND UPLINK REPETITION

(71) Applicant: QUALCOMM Incorporated, San Diego, CA (US)

(72) Inventors: Kiran Venugopal, Raritan, NJ (US); Wooseok Nam, San Diego, CA (US); Tianyang Bai, Somerville, NJ (US); Sungwoo Park, Seoul (KR); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/333,522

(22) Filed: May 28, 2021

(65) Prior Publication Data

US 2021/0410148 A1    Dec. 30, 2021

Related U.S. Application Data

(60) Provisional application No. 63/044,874, filed on Jun. 26, 2020.

(51) Int. Cl.
    *H04W 72/53*    (2023.01)
    *H04W 56/00*    (2009.01)
    (Continued)

(52) U.S. Cl.
    CPC ......... *H04W 72/53* (2023.01); *H04W 56/001* (2013.01); *H04W 72/046* (2013.01); *H04W 72/23* (2023.01)

(58) Field of Classification Search
    CPC . H04W 72/53; H04W 56/001; H04W 72/046; H04W 72/23; H04B 7/088; H04B 7/0695
    See application file for complete search history.

(56) References Cited

U.S. PATENT DOCUMENTS

2020/0100193 A1*  3/2020  Cheng ................. H04W 52/146
2021/0185647 A1*  6/2021  Rahman ................ H04L 5/0091

OTHER PUBLICATIONS

Ericsson: "High Level Views on Rel-17 feMIMO", 3GPP Draft, 3GPP TSG-RAN WG1 Meeting #101-e, R1-2004633, 3GPP, Mobile Competence Centre, vol. RAN WG1, No. eMeeting, May 25, 2020-Jun. 5, 2020, May 16, 2020, XP051886349, 13 pages, Retrieved from Internet: URL: https://ftp.3gpp.org/tsg_ran/WG1_RL1/TSGR1_101-e/Docs/R1-2004633.zip [retrieved May 16, 2020] p. 3, Section 2.1.3, p. 7 section 2,2,4, p. 2, section 2.1.1, line 12, p. 7 section 2.2.4, lines 1-2, p. 3, section 2.1.2, lines 2-3, p. 6, lines 6-10, p. 6, proposal 7, p. 1, section 2.1.

(Continued)

*Primary Examiner* — Kyaw Z Soe
(74) *Attorney, Agent, or Firm* — Procopio, Cory, Hargreaves & Savitch LLP

(57) ABSTRACT

To provide a more robust connection and better coverage, a UE may be configured to receive an SFN PDSCH through a plurality of beams from a plurality of TRPs including a first TRP and a second TRP, the plurality of beams being based on configured DL TCI states. The UE may be further configured to transmit a same PUSCH through each of the plurality of beams. In addition, the same PUSCH may be transmitted through a first beam of the plurality of beams n times, and transmitted through a second bream of the plurality of beams m times, where n and m are integers greater than or equal to one.

30 Claims, 12 Drawing Sheets

(51) Int. Cl.
*H04W 72/044* (2023.01)
*H04W 72/23* (2023.01)

(56) References Cited

OTHER PUBLICATIONS

Huawei, et al., "Summary of AI: 7.2.8.2 Enhancements on Multi-TRP/Panel Transmission of Offline Discussion", 3GPP Draft, 3GPP TSG-RAN WG1 Meeting #97, R1-1907706, FL Summary of Enhancements ONNCJT_V1, 3GPP, Mobile Competence Centre, vol. RAN WG1, No. Reno, USA, May 13, 2019-May 17, 2019, May 16, 2019, XP051739989, 66 pgs, Retrieved from Internet: URL: http://www.3gpp.org/ftp/tsg%5Fran/WG1%5FRL1/TSGR1%5F97/Docs/R1%2D1907706%2Ezip [retrieved May 16, 2019] Whole Document. HUAWEI_Multi_TRP_2019_66_Pgs_EFS, p. 56, pro 3-3.
International Search Report and Written Opinion—PCT/US2021/035292—ISA/EPO—dated Sep. 7, 2021.
Samsung: "View on Further Enhancements on MIMO for NR", 3GPP Draft, 3GPP TSG-RAN Meeting #88e, RP-200619, 3rd Generation Partnership Project (3GPP), Mobile Competence Centre, vol. TSG RAN, No. Electronic Meeting, Jun. 29, 2020-Jul. 3, 2020, Jun. 22, 2020 (Jun. 22, 2020), XP051903368, 18 pages, Retrieved from the Internet: URL: https://ftp.3gpp.org/tsg_ran/TSG_RAN/TSGR_88e/Docs/RP-200619.zip RP-200619 Rel17 FeMIMO.pptx [retrieved on Jun. 22, 2020] p. 3 left column, p. 6 point a), p. 8, p. 9.

\* cited by examiner

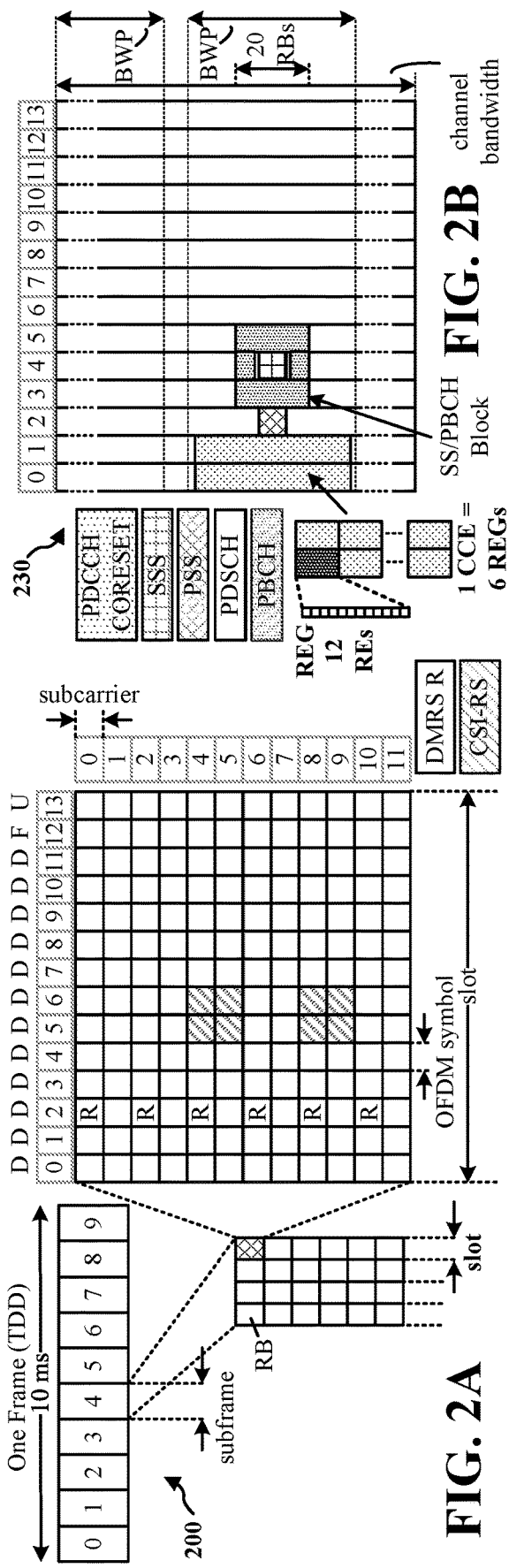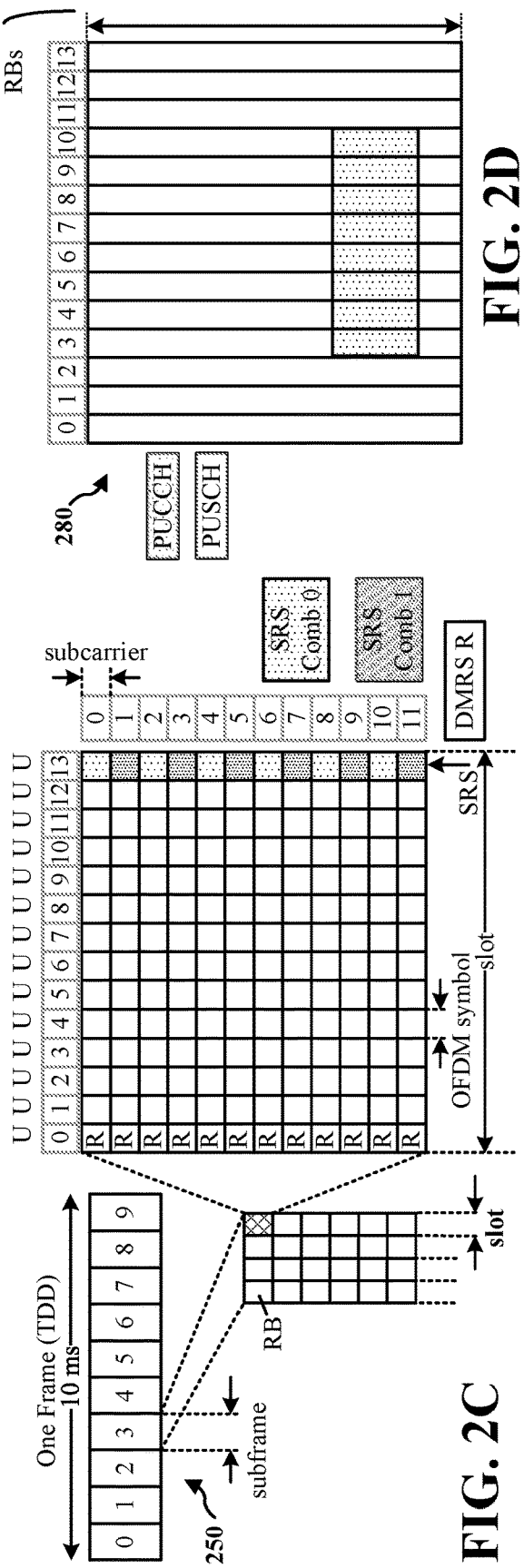
FIG. 2A
FIG. 2B
FIG. 2C
FIG. 2D

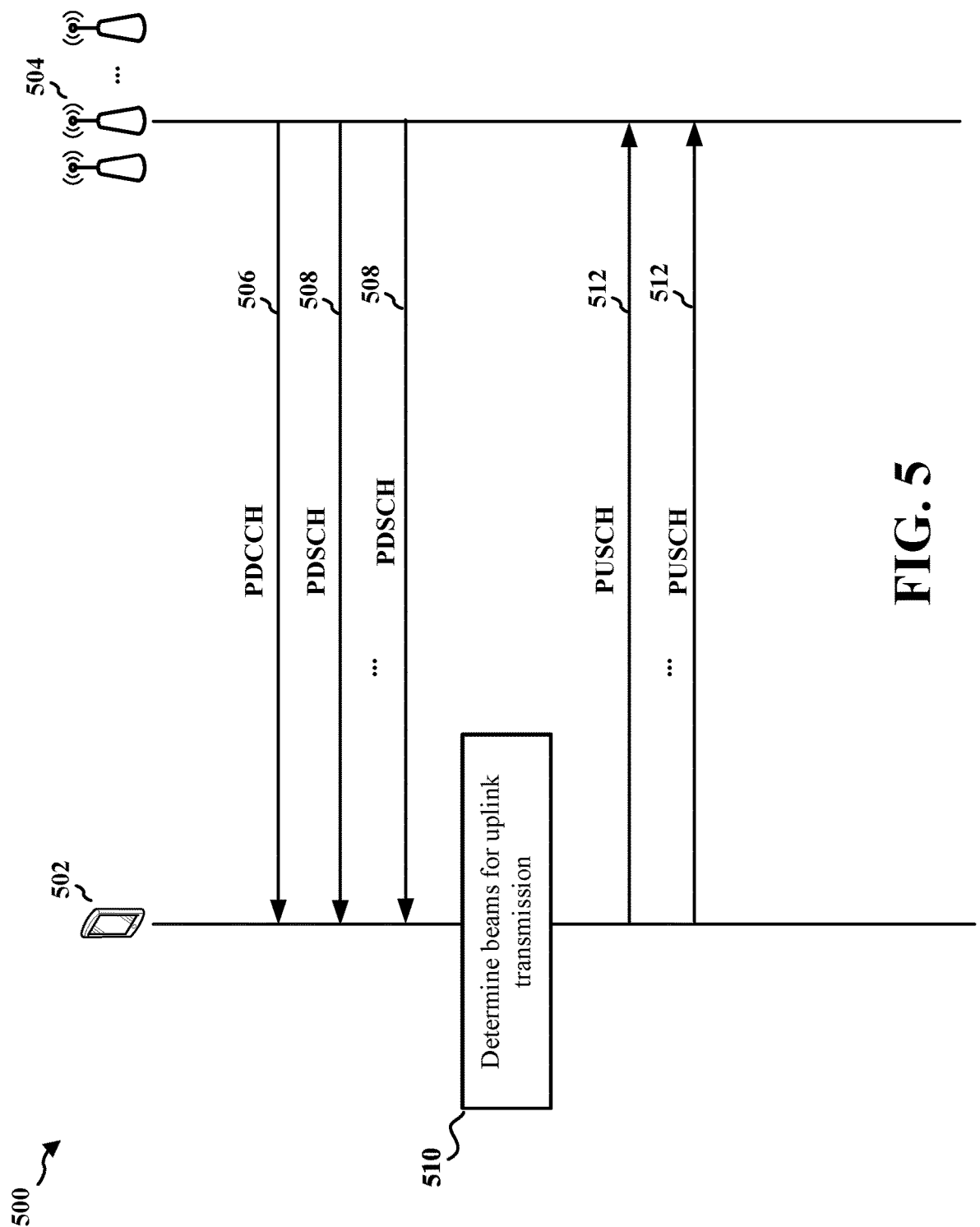

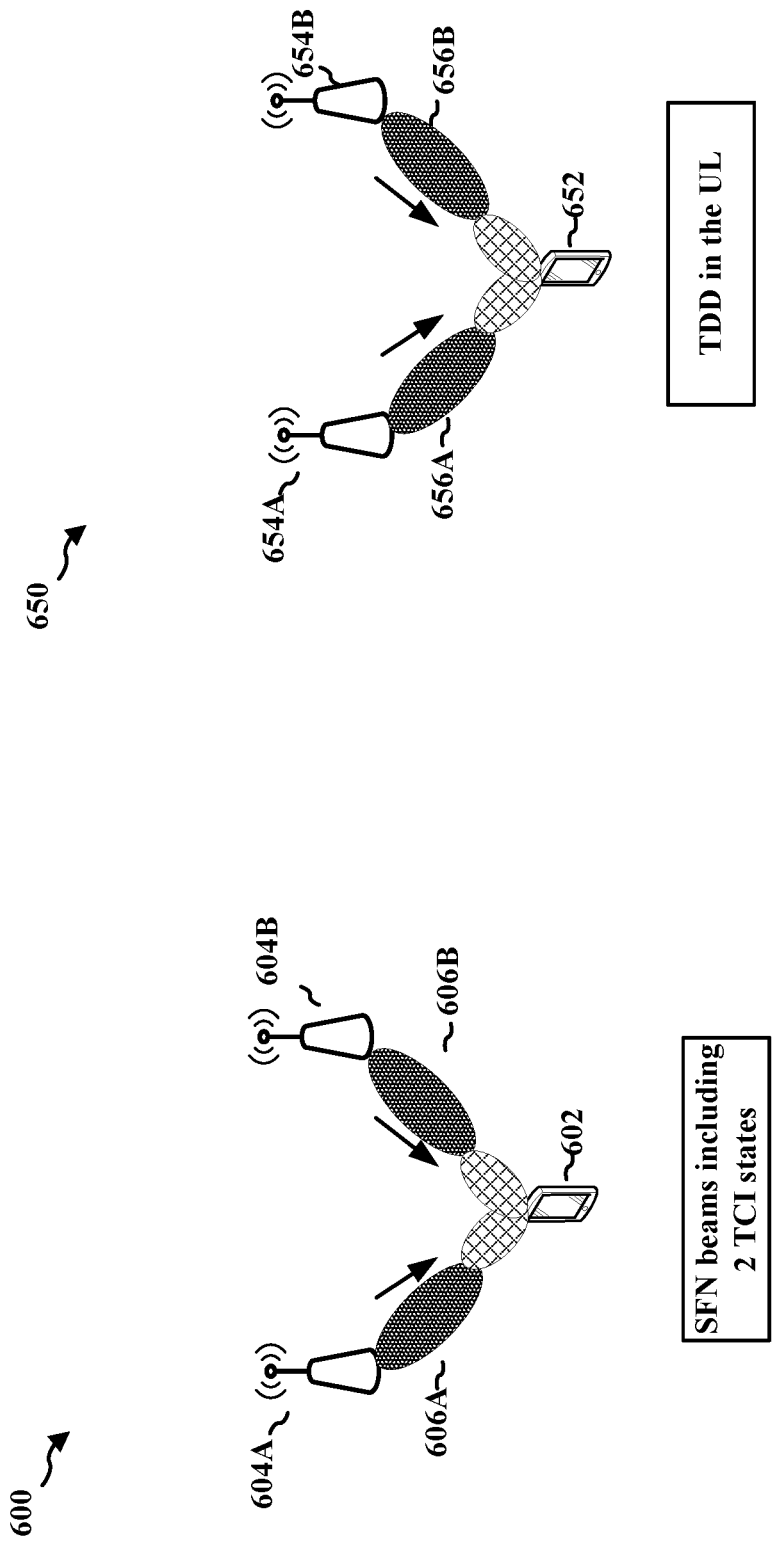

MIXED SFN AND UPLINK REPETITION

CROSS REFERENCE TO RELATED APPLICATION(S)

This application claims the benefit of and priority to U.S. Provisional Application Ser. No. 63/044,874, entitled "MIXED SFN AND UPLINK REPETITION" and filed on Jun. 26, 2020, which is expressly incorporated by reference herein in its entirety.

TECHNICAL FIELD

The present disclosure relates generally to communication systems, and more particularly, to a wireless communication network with single frequency network and uplink repetition.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To provide more robust connection and better coverage, a UE may be configured to receive a single frequency network (SFN) physical downlink shared channel (PDSCH) through a plurality of beams from a plurality of transmission reception points (TRPs) including a first TRP and a second TRP, the plurality of beams being based on configured downlink (DL) transmission configuration indicator (TCI) states. The UE may be further configured to transmit a same physical uplink shared channel (PUSCH) through each of the plurality of beams.

An example base station may transmit an SFN PDSCH through a plurality of beams from a plurality of TRPs including a first TRP and a second TRP, the plurality of beams being based on configured DL TCI states. The example base station may further receive a same PUSCH through each of the plurality of beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 5 shows a communication flow between a plurality of TRPs and a UE in accordance with some aspects of the present disclosure.

FIGS. 6A and 6B further illustrate different types of communication between TRPs and a UE.

DETAILED DESCRIPTION

Figure 1:
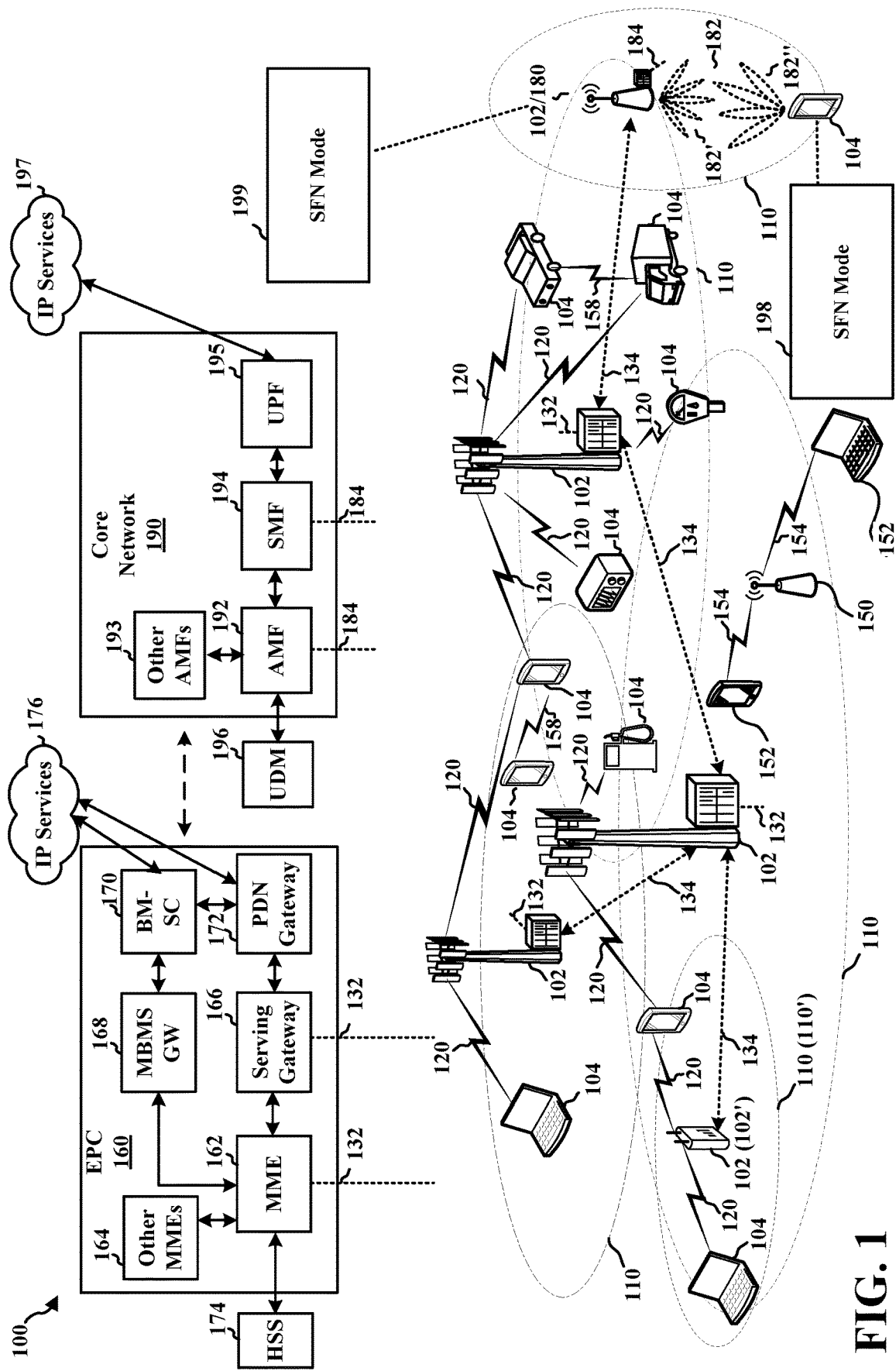
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may be configured to perform SFN mode 198 that includes receiving an SFN PDSCH through a plurality of beams from a plurality of TRPs including a first TRP and a second TRP, the plurality of beams being based on configured DL TCI states. The SFN mode 198 may further include transmitting a PUSCH through each of the plurality of beams.

In some aspects, the base station 102/180 may be configured to perform SFN mode 199 that includes transmitting an SFN PDSCH through a plurality of beams from a plurality of TRPs including a first TRP and a second TRP, the plurality of beams being based on configured DL TCI states. The SFN mode 199 may further include receiving a PUSCH through each of the plurality of beams.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = 2^μ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
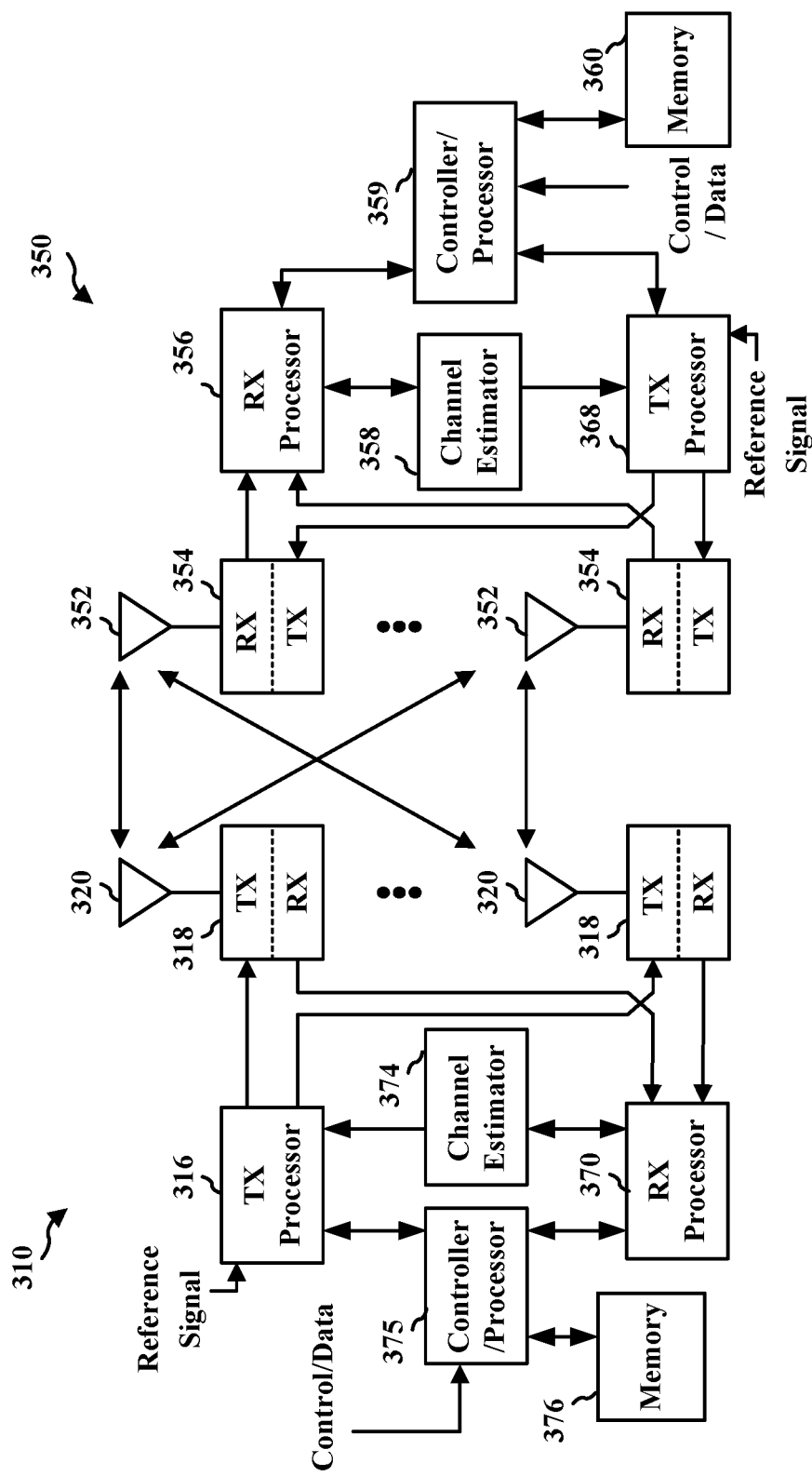
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SFN mode 198 of FIG. 1.

At least one of the TX processor 316, the RX processor 370, and the controller/processor 375 may be configured to perform aspects in connection with SFN mode 199 of FIG. 1.

Some wireless communication systems may be built based on the concept where one UE communicates with one serving base station at a given time. In 5G NR communication systems, multiple TRP techniques where one UE may simultaneously receive multiple data streams from different TRPs may be used to enhance robustness, coverage, and capacity of the wireless communication system. For example, UEs on a cell-edge may be served with a low quality of service (QoS) due to the relatively long distance from the base station and poor channel conditions where inter-cell interference is more likely to occur. Multiple TRP techniques may be used to improve the robustness and coverage for UEs on the cell-edge and may be used to improve reliability in various use cases, such as a high speed train (HST) use case.

SFN is one of multiple TRP techniques that may be utilized. In SFN, the same user data may be transmitted over multiple TRPs on the same frequency and time resources.

Figure 4C:
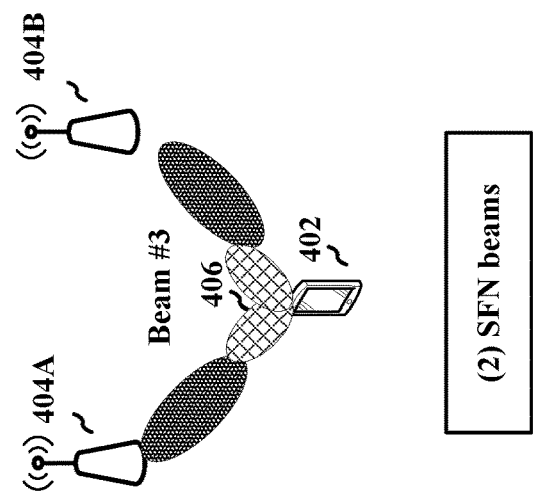
FIGS. 4A-4C illustrate different types of communication between TRPs and a UE.
Figure 4B:
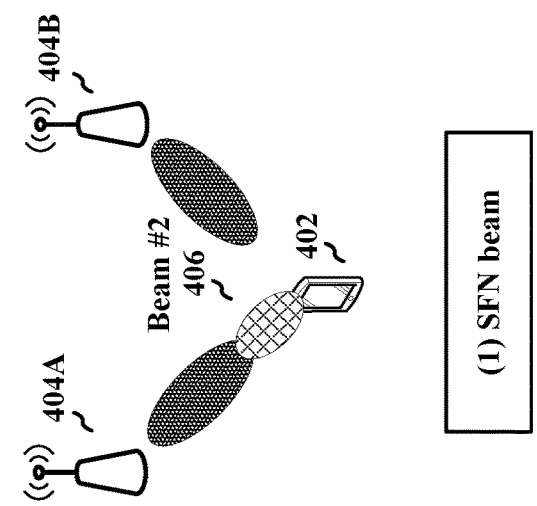
Figure 4A:
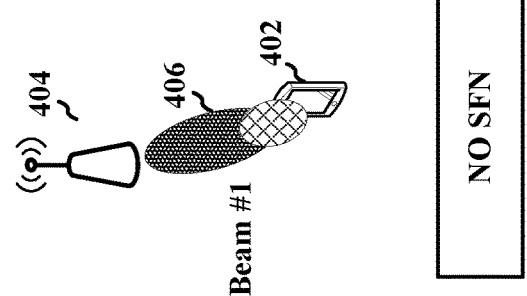

For example, a UE may receive a same PDSCH from multiple TRPs on the same frequency and time resources. Without SFN, as illustrated in FIG. 4A, a UE 402 may communicate with a base station 404 on a beam #1 406 that includes a transmission beam and a reception beam. Two options for SFN, i.e., transparent SFN and non-transparent SFN, may be provided. In transparent SFN, as illustrated in FIG. 4B, the UE 402 may be unaware that the TRP transmission beam included in the beam #2 406 is provided from separate TRPs 404A and 404B. The implementation of the transparent SFN may be on the base station side without UE-side implementation. In non-transparent SFN, as illustrated in FIG. 4C, the UE may receive an indication that, at 406, the TRP transmission beam is a combination of different beams from different TRPs 404A and 404B.

SFN may be mainly used for downlink communication such as a PDSCH. To improve the overall robustness and coverage, multiple TRP techniques may also be used for uplink communications. However, uplink SFN might not be a suitable multiple TRP technique to be used. To support uplink SFN, a UE may have multi-beam simultaneous transmission capability (e.g., multi-panel capability) and may have separate transmission power controls for receiving TRPs. Such multi-beam simultaneous transmission capability and separate transmission power controls may be too power consuming and/or consume too much space or computing resources for a UE. In addition, transmission timing (TA) for each TRP may be different for uplink SFN which complicates uplink signaling for the UE. Such complicated uplink signaling for the UE may further consume resources which may be inefficient for the UE. Some aspects of the present disclosure provide uplink TDM, FDM, or SDM with repetition to be used in conjunction with downlink SFN rather than using uplink SFN.

FIG. 5 shows a communication flow 500 between a UE 502 and a plurality of TRPs 504 including at least a first TRP and a second TRP. As illustrated in FIG. 5, the UE 502 may receive a PDCCH 506 from at least one TRP of the plurality of TRPs 504. The UE 502 may be a UE that is determined to be suitable for SFN downlink communication, such as a UE in HST, a UE on a cell-edge, or the like. In some aspects, the UE 502 may receive the PDCCH 506 from each of the TRPs 504 in an SFN. In some aspects, the UE may be configured to be in SFN mode by the one or more TRPs 504. In some aspects, the one or more TRPs 504 may configure the UE to be in SFN mode in the PDCCH 506. In some aspects, the PDCCH 506 may include a DCI.

In some aspects, each TRP in the plurality of TRPs 504 may be assumed to be quasi-co-located (QCL), e.g., have the same quasi-co-location. In some aspects, antenna ports of each TRP in the plurality of TRPs 504 may have the same QCL if properties of the channel over which a symbol on one antenna port is conveyed can be inferred from the channel over which a symbol on the other antenna port is conveyed. In some aspects, the TRPs 504 may have the same QCL in accordance with one or more of the QCL types: Type A which includes Doppler shift, Doppler spread, average delay, and delay spread; Type B which includes Doppler shift and Doppler spread; Type C which includes average delay and Doppler shift; and Type D which includes spatial receiving parameters. In some aspects, the TRPs in the plurality of TRPs 504 may have a same Type D QCL and may optionally have a same Type A, Type B, or Type C QCL type. The plurality of TRPs 504 may transmit an SFN PDSCH 508 to the UE 502. For example, each TRP in the plurality of TRPs 504 may transmit the PDSCH 508 to the UE 502 through a beam associated with the TRP using same frequency and time resources (e.g., frequency channel). As a result, the PDSCH 508 is transmitted through a plurality of transmission beams each associated with a TRP of the plurality of TRPs 504. In some aspects, the PDSCH 508 may be transmitted by each TRP of the TRPs 504 with different transmission powers. The PDSCH 508 may carry user data, system information, or the like. In some aspects, a downlink TCI codepoint associated with a plurality of TCI states that each may be associated with a TRP may be used for SFN. The TCI codepoint may be mapped to each TCI state associated with a respective beam (e.g., transmission beam and reception beam pair) used by each TRP of the plurality of TRPs 504. For example, as illustrated in example 600 of FIG. 6A, two TRPs (two are shown for illustrative purpose) TRP1 604A and TRP2 604B may transmit an SFN PDSCH in two TCI states TCI1 606A and TCI2 606B to a UE 602. Each TCI state may be associated with a transmission/reception beam pair associated with the TRP. If the UE 602 is configured with SFN mode, the TCI states associated with the TCI codepoint may be used for SFN PDSCH reception.

At 510, the UE 502 may determine a plurality of beams for transmitting a same PUSCH 512. The same PUSCH 512 transmitted through different beams may have a same logical channel and may carry the same uplink user data. In some aspects, the same PUSCH 512 transmitted through different beams may have different redundancy versions. The plurality of beams for transmitting the same PUSCH may be a plurality of TRP reception beams that each correspond with (e.g., in a same transmission/reception beam pair) a TRP transmission beam in the plurality of transmission beams used for transmitting the PDSCH 508. In some aspects, the UE 502 may determine the plurality of beams for transmitting a same PUSCH based on the downlink TCI codepoint or an uplink TCI codepoint. In some aspects, the same SSB/RS or TCI states are configured for uplink spatial relation or uplink TCI states for the UE 502. For example, a scheduling DCI transmitted in the PDCCH 506 may indicate a plurality of sounding reference signal (SRS) resource indicators (SRIs) for the PUSCH 512. Each SRI may be associated with a TRP of the plurality of TRPs 504 for a SRS resource that includes the SSB/RS as the spatial relation. The UE 502 may determine a plurality of beams each associated with a TRP of the plurality of TRPs 504 based on the SRI.

The plurality of beams determined based on the SRI may be a plurality of beams used for transmitting the PDSCH. For example, as illustrated in example 650 of FIG. 6B, if TRP 1 654A of the plurality of TRPs 504 used a TRP transmission beam 1 in beam pair 656A to transmit the PDSCH to a UE 652, SSB/RS or TCI states associated with the TRP 1 654A and the transmission beam 1 may be signaled to the UE 602/652. The UE 602/652 may in turn determine a TRP reception beam 1 in beam pair 656A that corresponds with the TRP transmission beam 1 to transmit the PUSCH 512 to the TRP 1 654A. If TRP 2 654B of the plurality of TRPs 504 used a TRP transmission beam 2 in beam pair 656B to transmit the PDSCH, SSB/RS or TCI states associated with the TRP 2 654B and the transmission beam 2 may be signaled to the UE 602/652. The UE 602/652 may in turn determine a TRP reception beam 2 in beam pair 656B that corresponds with the TRP transmission beam 2 to transmit the PUSCH 512 to the TRP 2 654B.

In some aspects, instead of having one SRI mapped to SRS resources associated with one beam of one TRP, a single SRI may be mapped to multiple SRS resources (and respective beams) associated with different TRPs. The mapping between SRI and SRS resources may be explicitly configured or implicitly derived from an SRS resource set configuration. For example, a resource set may be configured to include the respective SRS resources associated with each of the plurality of TRPs 504. The UE 502 may use the configured resource set to determine the plurality of beams associated with the SRS resources associated with each of the plurality of TRPs 504 to transmit the PUSCH 512. Alternatively, a single SRI may be explicitly mapped to the respective SRS resources that are associated with the plurality of beams.

In some aspects, an active uplink TCI codepoint may be mapped to a plurality of uplink TCI states each associated with a TRP of the plurality of TRPs 504 (and respective beams). In such aspects, the source QCL for the uplink TCI state may be the respective downlink RS/SSB of the respective TRPs. For example, the downlink RS/SSB may be included in the downlink TCI codepoint previously described.

In some aspects, the same PUSCH 512 may be transmitted to each TRP of the plurality of TRPs 504 using TDM, FDM, or SDM. In some aspects, different transmission powers, timing advances, redundancy versions, modulation orders, or other specific transmission parameters that do not affect uplink user data to be carried in a PUSCH may be different for each same PUSCH transmitted to each TRP of the plurality of TRPs 504. In some aspects, the different transmission powers, timing advances, redundancy versions, modulation orders, or other specific transmission parameters that do not affect uplink user data to be carried in PUSCH may be configured by one or more base stations associated with one or more of the plurality of TRPs 504. In some alternative aspects, plurality of TRPs 504 may be determined by the UE 502 and indicated to one or more base stations associated with the plurality of TRPs 504 to facilitate decoding.

In some aspects, a repetition mode may be configured or applied for the UE 502. For example, the same PUSCH may be transmitted to a first TRP of the plurality of TRPs 504 through a first beam of the plurality of beams n times, and transmitted to a second TRP of the plurality of TRPs 504 through a second bream of the plurality of beams m times. Also, n and m may be integers greater than or equal to one. For example, if a repetition to a first TRP TRP1 using SSB1 and an associated beam is denoted by A and if a repetition to a second TRP TRP2 using SSB2 and an associated beam is denoted by B, the repetition may be AAAB, AABB, ABBB, or the like. In some examples, the number of repetitions, the repetition pattern, or the like may be configurable. In some aspects, if the same PUSCH 512 is transmitted to each TRP of the plurality of TRPs 504 using FDM, the number of repetitions n and m may be determined at least in part on the bandwidth used.

Figure 7:
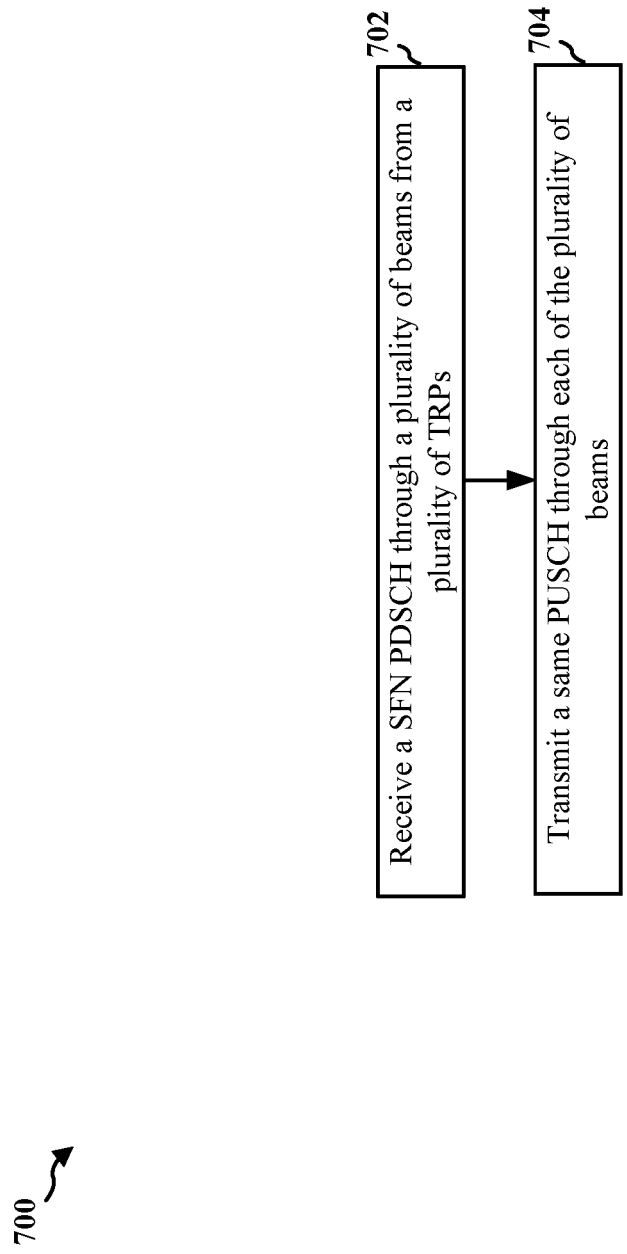
FIG. 7 is a flowchart of a method of wireless communication at a UE.

FIG. 7 is a flowchart 700 of a method of wireless communication. The method may be performed by a UE (e.g., the UE 104, the UE 502; the apparatus 902).

At 702, the UE may receive an SFN PDSCH through a plurality of beams from a plurality of TRPs including a first TRP and a second TRP, the plurality of beams being based on configured downlink TCI states. For example, referring to FIG. 5, the UE 502 may receive an SFN PDSCH through a plurality of beams from a plurality of TRPs 504 that may have QCL assumption. The PDSCH may carry the same user data and may be transmitted using the same frequency resources. The PDSCH may be transmitted with different transmission power from the plurality of TRPs 504. In some aspects, 702 may be performed by the reception component 930 in FIG. 9.

At 704, the UE may transmit a same PUSCH through each of the plurality of beams. For example, referring to FIG. 5, the UE 502 may transmit a same PUSCH 512 which carries the same uplink user data but may have different specific transmission parameters through each of the plurality of beams. In some aspects, 704 may be performed by the transmission component 934 in FIG. 9.

Figure 8:
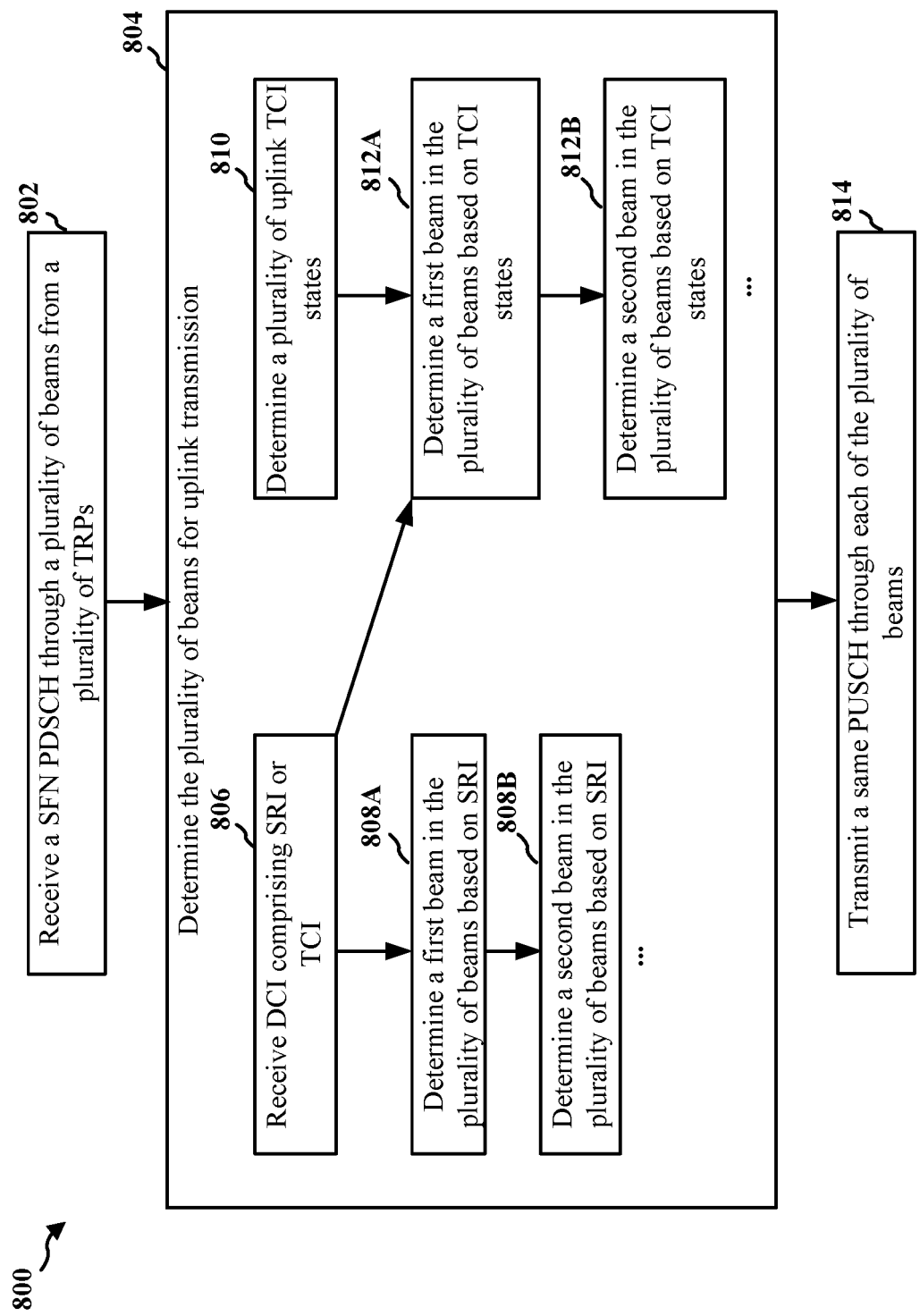
FIG. 8 is a flowchart of a method of wireless communication at a UE.

FIG. 8 is a flowchart 800 of a method of wireless communication. The method may be performed by a UE (e.g., the UE 104, the UE 502; the apparatus 902). At 802, the UE may receive an SFN PDSCH through a plurality of beams from a plurality of TRPs including a first TRP and a second TRP, the plurality of beams being based on configured downlink TCI states. For example, referring to FIG. 5, the UE 502 may receive an SFN PDSCH through a plurality of beams from a plurality of TRPs 504 that may have QCL assumption. The PDSCH may carry the same user data and may be transmitted using the same frequency resources. The PDSCH may be transmitted with different transmission power from the plurality of TRPs 504. In some aspects, the same PUSCH may be transmitted through each of the plurality of beams through one of TDM, FDM, or SDM. In some aspects, 802 may be performed by the reception component 930 in FIG. 9.

At 804, the UE may determine the plurality of beams for uplink transmission. For example, referring to FIG. 5, the UE 502 may determine the plurality of beams for uplink transmission at 510 as previously described in connection with FIG. 5. In some aspects, as part of 804, the UE receives DCI including SRI at 806. For example, the UE 502 may receive DCI including SRI (e.g., transmitted in the PDCCH 506) from the TRP 504 as previously described in connection with FIG. 5. In some aspects, the DCI may indicate a plurality of SRIs for a PUSCH. A first SRI of the of the SRIs may be associated with at least one of a SSB or RS of the first TRP in the plurality of TRPs and a second SRI of the of the SRIs may be associated with at least one of a SSB or RS of the second TRP in the plurality of TRPs. More SRIs may be associated with other TRPs in the plurality of TRPs if applicable. In such aspects, as part of 804, at 808A, the UE may determine, based on the first SRI, a first beam of the plurality of beams based on the first beam being used for receiving the at least one of the SSB or the RS from the first TRP. For example, the UE 502 determine, based on the first SRI, a first beam of the plurality of beams based on the first beam being used for receiving the at least one of the SSB or the RS from the first TRP. As part of 804, at 808B, the UE may determine, based on the second SRI, a second beam of the plurality of beams based on the second beam being used for receiving the at least one of the SSB or the RS from the second TRP. For example, the UE 502 may determine, based on the second SRI, a second beam of the plurality of beams based on the second beam being used for receiving the at least one of the SSB or the RS from the second TRP. The UE may further determine, based on additional SRI(s), one or more additional beams of the plurality of beams based on the one or more additional beams used for receiving the at least one of the SSB or the RS from one or more TRPs of the plurality of TRPs. In some aspects, 804 may be performed by the beam determination component 940 in FIG. 9.

In some aspects, the DCI may indicate an SRI for the PUSCH and the SRI is associated with at least one of a SSB or RS of the first TRP and with at least one of an SSB or RS of the second TRP. In such aspects, as part of 804, at 808A, the UE may determine, based on the SRI, a first beam of the plurality of beams based on the first beam being used for receiving the at least one of the SSB or the RS from the first TRP. For example, the UE 502 may determine, based on the SRI, a first beam of the plurality of beams based on the first beam being used for receiving the at least one of the SSB or the RS from the first TRP. As part of 804, at 808B, the UE may determine, based on the SRI, a second beam of the plurality of beams based on the second beam being used for receiving the at least one of the SSB or the RS from the second TRP. For example, the UE 502 may determine, based on the SRI, a second beam of the plurality of beams based on the second beam being used for receiving the at least one of the SSB or the RS from the second TRP. The UE may further determine, based on the SRI, one or more additional beams of the plurality of beams based on the one or more additional beams used for receiving the at least one of the SSB or the RS from one or more TRPs of the plurality of TRPs.

In some aspects, as part of 804, at 810, the UE may determine a plurality of uplink TCI states. A first TCI state of the TCI states may be associated with at least one of a SSB or RS of the first TRP and a second TCI state of the TCI states may be associated with at least one of an SSB or RS of the second TRP. For example, the UE 502 may determine a plurality of uplink TCI states. In some alternative aspects, the UE may receive the plurality of uplink TCI states in DCI at 806. In such aspects related to uplink TCI states, as part of 804, at 812A, the UE may determine, based on the first TCI state, a first beam of the plurality of beams based on the first beam being used for receiving the at least one of the SSB or the RS from the first TRP. For example, the UE 502 may determine, based on the first TCI state, a first beam of the plurality of beams based on the first beam being used for receiving the at least one of the SSB or the RS from the first TRP. As part of 804, at 812B, the UE may determine, based on the second TCI state, a second beam of the plurality of beams based on the second beam being used for receiving the at least one of the SSB or the RS from the second TRP. For example, the UE 502 may determine, based on the second TCI state, a second beam of the plurality of beams based on the second beam being used for receiving the at least one of the SSB or the RS from the second TRP. The UE may further determine one or more additional beams of the plurality of beams based on one or more additional beams used for receiving the at least one of the SSB or the RS from one or more TRPs in the plurality of TRPs.

At 814, the UE may transmit a same PUSCH through each of the plurality of beams. For example, referring to FIG. 5, the UE 502 may transmit a same PUSCH 512 which carries the same uplink user data but may have different specific transmission parameters through each of the plurality of beams determined at 804. In some aspects, 814 may be performed by the transmission component 934 in FIG. 9. In some aspects, the PUSCH may be transmitted through each of the plurality of beams with at least one of a different transmit power, a different timing advance, or different redundancy versions. In some aspects, the different redundancy versions may correspond to at least one repetition of the PUSCH. In some aspects, at least one of the different transmit power, the different timing advance, or the different redundancy versions may be signaled by a base station associated with one or more of the TRPs. In some aspects, at least one of the different transmit power, the different timing advance, or the different redundancy versions may be determined by the UE. In some aspects, the PUSCH may be transmitted through a first beam of the plurality of beams n times, and transmitted through a second bream of the plurality of beams m times, where n and m are integers greater than or equal to one.

Figure 9:
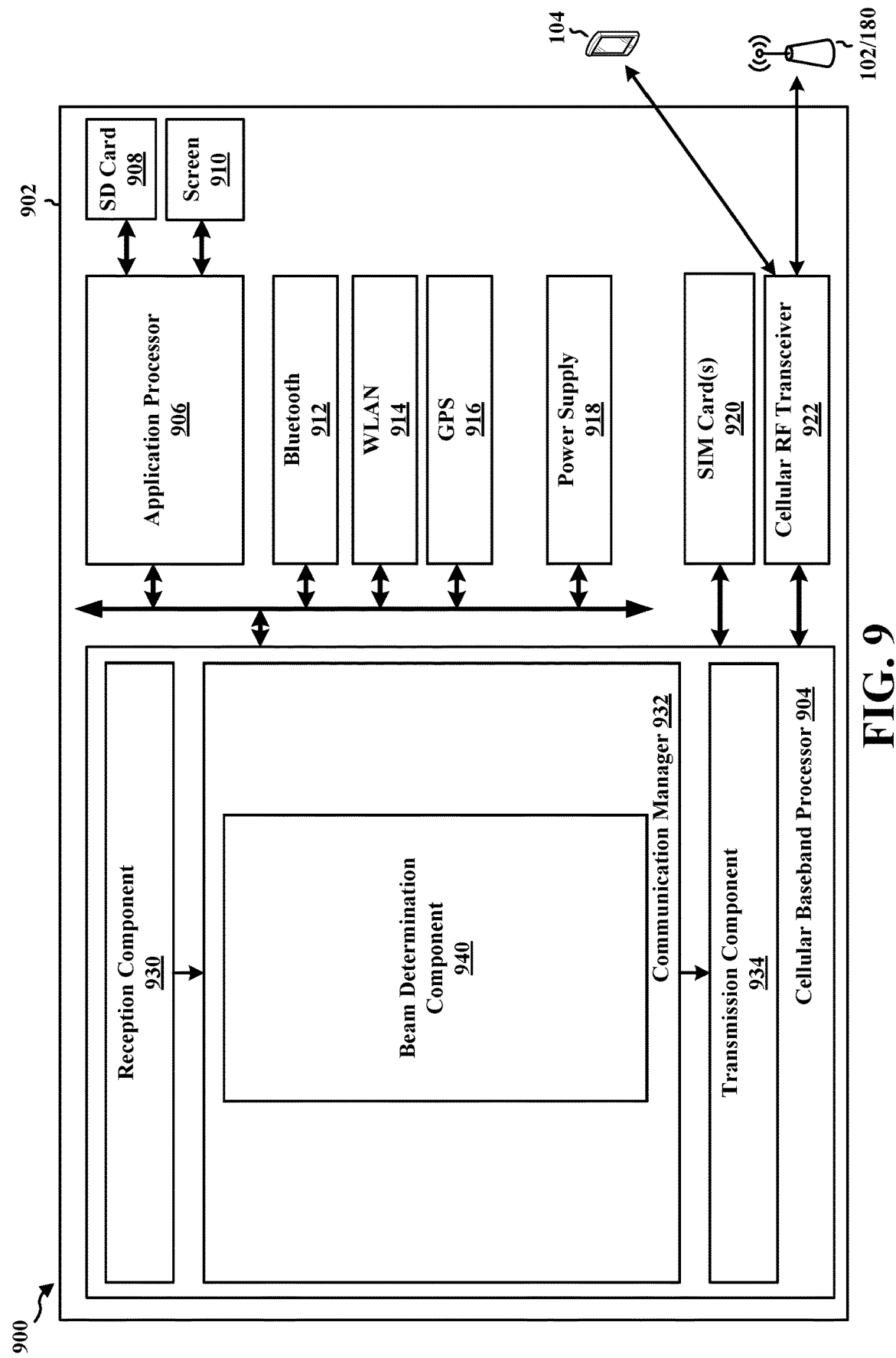
FIG. 9 is a diagram illustrating an example of a hardware implementation for an example apparatus.

FIG. 9 is a diagram 900 illustrating an example of a hardware implementation for an apparatus 902. The apparatus 902 may be a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. In some aspects, the reception component 930 may be configured to receive an SFN PDSCH through a plurality of beams from a plurality of TRPs, e.g., as described in connection with block 702 of FIG. 7 and block 802 of FIG. 8. In some aspects, the transmission component 934 may be configured to transmit a same PUSCH through each of the plurality of beams, e.g., as described in connection with block 704 of FIG. 7 and block 814 of FIG. 8. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a beam determination component 940 that is configured to determine a plurality of beams, e.g., as described in connection with 804 of FIG. 8. The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving an SFN PDSCH through a plurality of beams from a plurality of TRPs including a first TRP and a second TRP, the plurality of beams being based on configured downlink TCI states and means for transmitting a same PUSCH through each of the plurality of beams. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
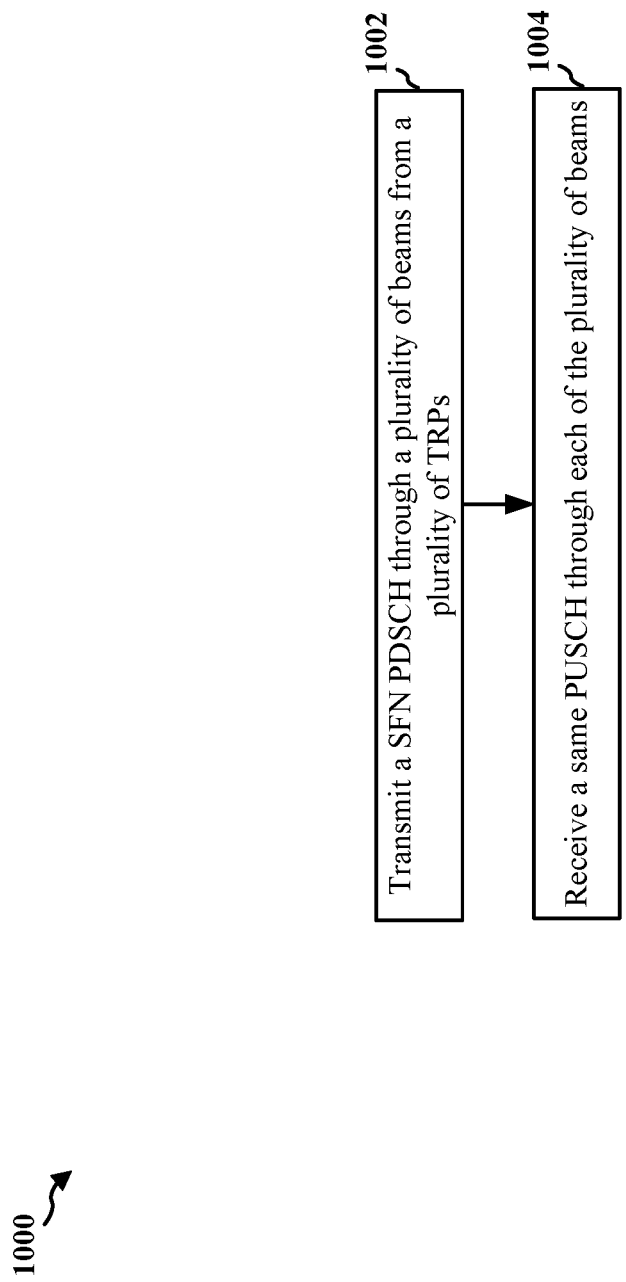
FIG. 10 is a flowchart of a method of wireless communication at a base station.

FIG. 10 is a flowchart 1000 of a method of wireless communication. The method may be performed by a base station (e.g., the base station 102/180, the TRP 504; the apparatus 1202). At 1002, the base station may transmit an SFN PDSCH through a plurality of beams from a plurality of TRPs including a first TRP and a second TRP, the plurality of beams being based on configured downlink TCI states. For example, referring to FIG. 5, the TRP 504 may transmit an SFN PDSCH through a plurality of beams from a plurality of TRPs 504 that may have QCL assumption. The PDSCH may carry the same user data and may be transmitted using the same frequency resources. The PDSCH may be transmitted with different transmission power from the plurality of TRPs 504. In some aspects, 1002 may be performed by the PDSCH component 1242 in FIG. 12. In some aspects, the same PUSCH may be received through each of the plurality of beams through one of TDM, FDM, or SDM.

At 1004, the base station may receive a same PUSCH through each of the plurality of beams. For example, referring to FIG. 5, the TRP 504 may receive a same PUSCH 512 which carries the same uplink user data but may have different specific transmission parameters through each of the plurality of beams determined at 804. In some aspects, 1004 may be performed by the PUSCH component 1246 in FIG. 12. In some aspects, the same PUSCH may be received through each of the plurality of beams with at least one of a different transmit power, a different timing advance, or different redundancy versions. In some aspect, the same PUSCH may be received through a first beam of the plurality of beams n times, and received through a second bream of the plurality of beams m times, where n and m are integers greater than or equal to one. In some aspects, the reception of the same PUSCH is through the first and second beams.

Figure 11:
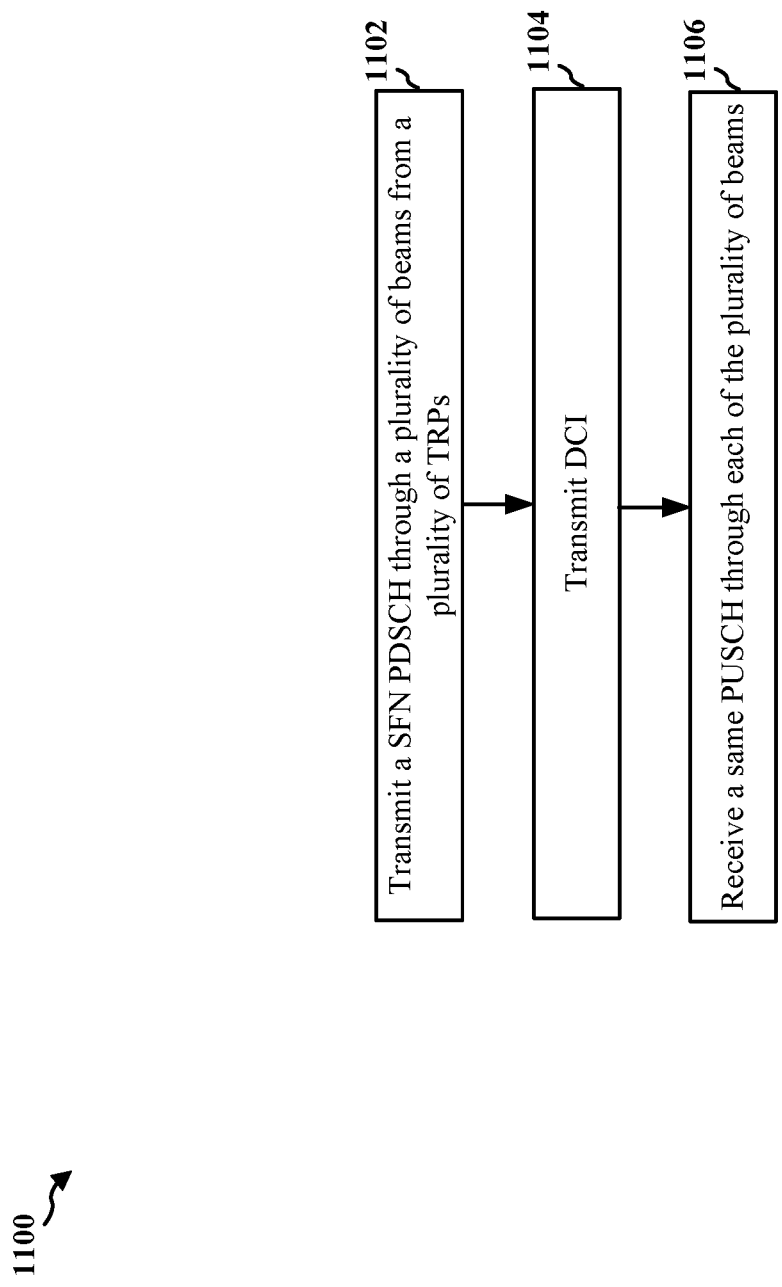
FIG. 11 is a flowchart of a method of wireless communication at a base station.

FIG. 11 is a flowchart 1100 of a method of wireless communication. The method may be performed by a base station (e.g., the base station 102/180, the TRP 504; the apparatus 1202). At 1102, the base station may transmit an SFN PDSCH through a plurality of beams from a plurality of TRPs including a first TRP and a second TRP, the plurality of beams being based on configured downlink TCI states. For example, referring to FIG. 5, the TRP 504 may transmit an SFN PDSCH through a plurality of beams from a plurality of TRPs 504 that may have QCL assumption. The PDSCH may carry the same user data and may be transmitted using the same frequency resources. The PDSCH may be transmitted with different transmission power from the plurality of TRPs 504. In some aspects, 1102 may be performed by the PDSCH component 1242 in FIG. 12. In some aspects, the same PUSCH may be received through each of the plurality of beams through one of TDM, FDM, or SDM.

At 1104, the base station may transmit DCI. For example, referring to FIG. 5, the TRP 504 may transmit a DCI (such as in PDCCH 506) to a UE 502. In some aspects, the DCI may indicate a plurality of SRIs for the PUSCH, a first SRI of the SRIs being associated with at least one of a SSB or RS of the first TRP, a second SRI of the SRIs being associated with at least one of an SSB or RS of the second TRP. In some aspects, 1104 may be performed by the DCI component 1244 in FIG. 12. In some aspects, the DCI may indicate an SRI for the PUSCH, the SRI being associated with at least one of a SSB or RS of the first TRP and with at least one of an SSB or RS of the second TRP. In some aspects, the DCI may indicate a plurality of UL TCI states, a first TCI state of the TCI states being associated with at least one of a SSB or RS of the first TRP, a second TCI state of the TCI states being associated with at least one of an SSB or RS of the second TRP.

At 1106, the base station may receive a same PUSCH through each of the plurality of beams. For example, referring to FIG. 5, the TRP 504 may receive a same PUSCH 512 which carries the same uplink user data but may have different specific transmission parameters through each of the plurality of beams determined at 804. In some aspects, 1106 may be performed by the PUSCH component 1246 in FIG. 12. In some aspects, the same PUSCH may be received through each of the plurality of beams with at least one of a different transmit power, a different timing advance, or different redundancy versions. In some aspect, the same PUSCH may be received through a first beam of the plurality of beams n times, and received through a second bream of the plurality of beams m times, where n and m are integers greater than or equal to one. In some aspects, the reception of the same PUSCH is through the first and second beams.

Figure 12:
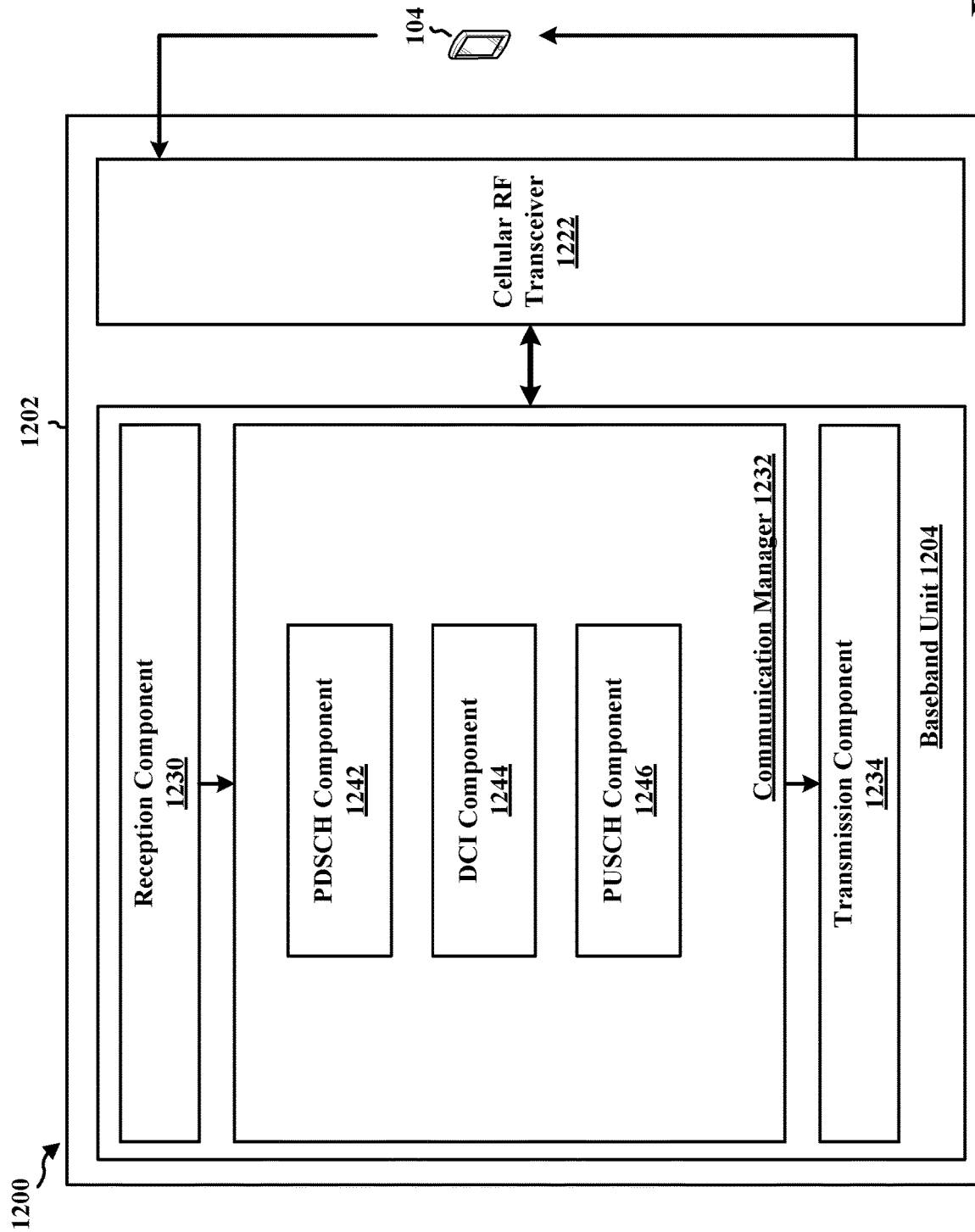
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 may include a PDSCH component 1242 that may transmit an SFN PDSCH through a plurality of beams from a plurality of TRPs, e.g., as described in connection with block 1002 of FIG. 10 and block 1102 of FIG. 11. The communication manager 1232 further may include a DCI component 1244 that may transmit DCI, e.g., as described in connection with block 1104 of FIG. 11. The communication manager 1232 further may include a PUSCH component 1246 that may receive a same PUSCH through each of the plurality of beams, e.g., as described in connection with block 1004 of FIG. 10 and block 1106 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, may include means for transmitting an SFN PDSCH through a plurality of beams from a plurality of TRPs including a first TRP and a second TRP, the plurality of beams being based on configured DL TCI states. The baseband unit 1204 may further include means for receiving a same PUSCH through each of the plurality of beams. The baseband unit 1204 may further include means for transmitting DCI. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive a SFN PDSCH through a plurality of beams from a plurality of TRPs including a first TRP and a second TRP, the plurality of beams being based on configured DL TCI states; and transmit a same PUSCH through each of the plurality of beams.

Aspect 2 is the apparatus of aspect 1, wherein the same PUSCH is transmitted through each of the plurality of beams through one of TDM, FDM, or SDM.

Aspect 3 is the apparatus of any of aspects 1-2, wherein the at least one processor coupled to the memory is further configured to: receive DCI indicating a plurality of SRIs for the PUSCH, a first SRI of the SRIs being associated with at least one of a SSB or RS of the first TRP, a second SRI of the SRIs being associated with at least one of an SSB or RS of the second TRP; determine, based on the first SRI, a first beam of the plurality of beams based on the first beam being used for receiving the at least one of the SSB or the RS from the first TRP; and determine, based on the second SRI, a second beam of the plurality of beams based on the second beam being used for receiving the at least one of the SSB or the RS from the second TRP, wherein the transmission of the same PUSCH is through the first and second beams.

Aspect 4 is the apparatus of any of aspects 1-3, wherein the at least one processor coupled to the memory is further configured to: receive DCI indicating a SRI for the PUSCH, the SRI being associated with at least one of a SSB or RS of the first TRP and with at least one of an SSB or RS of the second TRP; determine, based on the SRI, a first beam of the plurality of beams based on the first beam being used for receiving the at least one of the SSB or the RS from the first TRP; and determine, based on the SRI, a second beam of the plurality of beams based on the second beam being used for receiving the at least one of the SSB or the RS from the second TRP, wherein the transmission of the same PUSCH is through the first and second beams.

Aspect 5 is the apparatus of any of aspects 1-4, wherein the at least one processor coupled to the memory is further configured to: determine a plurality of ULTCI states, a first TCI state of the TCI states being associated with at least one of a SSB or RS of the first TRP, a second TCI state of the TCI states being associated with at least one of an SSB or RS of the second TRP; determine, based on the first TCI state, a first beam of the plurality of beams based on the first beam being used for receiving the at least one of the SSB or the RS from the first TRP; and determine, based on the second TCI state, a second beam of the plurality of beams based on the second beam being used for receiving the at least one of the SSB or the RS from the second TRP, wherein the transmission of the same PUSCH is through the first and second beams.

Aspect 6 is the apparatus of any of aspects 1-5, wherein the at least one processor coupled to the memory is further configured to: receive DCI indicating a plurality of ULTCI states, a first TCI state of the TCI states being associated with at least one of a SSB or RS of the first TRP, a second TCI state of the TCI states being associated with at least one of an SSB or RS of the second TRP; determine, based on the first TCI state, a first beam of the plurality of beams based on the first beam being used for receiving the at least one of the SSB or the RS from the first TRP; and determine, based on the second TCI state, a second beam of the plurality of beams based on the second beam being used for receiving the at least one of the SSB or the RS from the second TRP, wherein the transmission of the same PUSCH is through the first and second beams.

Aspect 7 is the apparatus of any of aspects 1-6, wherein the same PUSCH is transmitted through each of the plurality of beams with at least one of a different transmit power, a different timing advance, or different redundancy versions.

Aspect 8 is the apparatus of any of aspects 1-7, wherein the different redundancy versions correspond to at least one repetition of the PUSCH.

Aspect 9 is the apparatus of any of aspects 1-8, wherein at least one of the different transmit power, the different timing advance, or the different redundancy versions are signaled by a base station associated with one or more of the TRPs.

Aspect 10 is the apparatus of any of aspects 1-9, wherein at least one of the different transmit power, the different timing advance, or the different redundancy versions are determined by the UE.

Aspect 11 is the apparatus of any of aspects 1-10, wherein the same PUSCH is transmitted through a first beam of the plurality of beams n times, and transmitted through a second bream of the plurality of beams m times, where n and m are integers greater than or equal to one.

Aspect 12 is the apparatus of any of aspects 1-11, wherein the at least one processor coupled to the memory is further configured to: receive DCI comprising an uplink TCI codepoint that maps to a plurality of ULTCI states, a first TCI state of the TCI states being associated with at least one of a SSB or RS of the first TRP, a second TCI state of the TCI states being associated with at least one of an SSB or RS of the second TRP; determine, based on the first TCI state, a first beam of the plurality of beams based on the first beam being used for receiving the at least one of the SSB or the RS from the first TRP; and determine, based on the second TCI state, a second beam of the plurality of beams based on the second beam being used for receiving the at least one of the SSB or the RS from the second TRP, wherein the transmission of the same PUSCH is through the first and second beams.

Aspect 13 is the apparatus of any of aspects 1-12, wherein the at least one processor coupled to the memory is further configured to: receive DCI comprising an uplink TCI codepoint that maps to a plurality of ULTCI states, a first TCI state of the TCI states being associated with at least one of a SSB or RS of the first TRP, a second TCI state of the TCI states being associated with at least one of an SSB or RS of the second TRP; determine, based on the first TCI state, a first beam of the plurality of beams based on the first beam being used for receiving the at least one of the SSB or the RS from the first TRP; and determine, based on the second TCI state, a second beam of the plurality of beams based on the second beam being used for receiving the at least one of the SSB or the RS from the second TRP, wherein the transmission of the same PUSCH is through the first and second beams.

Aspect 14 is a method of wireless communication at a UE, comprising: receiving a SFN PDSCH through a plurality of beams from a plurality of TRPs including a first TRP and a second TRP, the plurality of beams being based on configured DL TCI states; and transmitting a PUSCH through each of the plurality of beams.

Aspect 15 is the method of aspect 14, wherein the PUSCH is transmitted through each of the plurality of beams through one of TDM, FDM, or SDM.

Aspect 16 is the method of any of aspects 14-15, further comprising: receiving DCI indicating a plurality of SRIs for the PUSCH, a first SRI of the SRIs being associated with at least one of a SSB or RS of the first TRP, a second SRI of the SRIs being associated with at least one of an SSB or RS of the second TRP; determining, based on the first SRI, a first beam of the plurality of beams based on the first beam being used for receiving the at least one of the SSB or the RS from the first TRP; and determining, based on the second SRI, a second beam of the plurality of beams based on the second beam being used for receiving the at least one of the SSB or the RS from the second TRP, wherein the transmission of the PUSCH is through the first and second beams.

Aspect 17 is the method of any of aspects 14-16, further comprising: receiving DCI indicating a SRI for the PUSCH, the SRI being associated with at least one of a SSB or RS of the first TRP and with at least one of an SSB or RS of the second TRP; determining, based on the SRI, a first beam of the plurality of beams based on the first beam being used for receiving the at least one of the SSB or the RS from the first TRP; and determining, based on the SRI, a second beam of the plurality of beams based on the second beam being used for receiving the at least one of the SSB or the RS from the second TRP, wherein the transmission of the PUSCH is through the first and second beams.

Aspect 18 is the method of any of aspects 14-17, further comprising: determining a plurality of ULTCI states, a first TCI state of the TCI states being associated with at least one of a SSB or RS of the first TRP, a second TCI state of the TCI states being associated with at least one of an SSB or RS of the second TRP; determining, based on the first TCI state, a first beam of the plurality of beams based on the first beam being used for receiving the at least one of the SSB or the RS from the first TRP; and determining, based on the second TCI state, a second beam of the plurality of beams based on the second beam being used for receiving the at least one of the SSB or the RS from the second TRP, wherein the transmission of the PUSCH is through the first and second beams.

Aspect 19 is the method of any of aspects 14-18, further comprising: receiving DCI indicating a plurality of ULTCI states, a first TCI state of the TCI states being associated with at least one of a SSB or RS of the first TRP, a second TCI state of the TCI states being associated with at least one of an SSB or RS of the second TRP; determining, based on the first TCI state, a first beam of the plurality of beams based on the first beam being used for receiving the at least one of the SSB or the RS from the first TRP; and determining, based on the second TCI state, a second beam of the plurality of beams based on the second beam being used for receiving the at least one of the SSB or the RS from the second TRP, wherein the transmission of the PUSCH is through the first and second beams.

Aspect 20 is the method of any of aspects 14-19, wherein the PUSCH is transmitted through each of the plurality of beams with at least one of a different transmit power, a different timing advance, or different redundancy versions.

Aspect 21 is the method of any of aspects 14-20, wherein the different redundancy versions correspond to at least one repetition of the PUSCH.

Aspect 22 is the method of any of aspects 14-21, wherein at least one of the different transmit power, the different timing advance, or the different redundancy versions are signaled by a base station associated with one or more of the TRPs.

Aspect 23 is the method of any of aspects 14-22, wherein at least one of the different transmit power, the different timing advance, or the different redundancy versions are determined by the UE.

Aspect 24 is the method of any of aspects 14-23, wherein the PUSCH is transmitted through a first beam of the plurality of beams n times, and transmitted through a second bream of the plurality of beams m times, where n and m are integers greater than or equal to one.

Aspect 25 is the method of any of aspects 14-24, further comprising: receiving DCI comprising an uplink TCI codepoint that maps to a plurality of ULTCI states, a first TCI state of the TCI states being associated with at least one of a SSB or RS of the first TRP, a second TCI state of the TCI states being associated with at least one of an SSB or RS of the second TRP; determining, based on the first TCI state, a first beam of the plurality of beams based on the first beam being used for receiving the at least one of the SSB or the RS from the first TRP; and determining, based on the second TCI state, a second beam of the plurality of beams based on the second beam being used for receiving the at least one of the SSB or the RS from the second TRP, wherein the transmission of the same PUSCH is through the first and second beams.

Aspect 26 is an apparatus for wireless communication at a base station, comprising: a memory; and at least one processor coupled to the memory and configured to: transmit a SFN PDSCH through a plurality of beams from a plurality of TRPs including a first TRP and a second TRP, the plurality of beams being based on configured DL TCI states; and receive a same PUSCH through each of the plurality of beams.

Aspect 27 is the apparatus of aspect 26, wherein the same PUSCH is received through each of the plurality of beams through one of TDM, FDM, or SDM.

Aspect 28 is the apparatus of any of aspects 26-27, wherein the same PUSCH is received through each of the plurality of beams with at least one of a different transmit power, a different timing advance, or different redundancy versions.

Aspect 29 is the apparatus of any of aspects 26-28, wherein the same PUSCH is received through a first beam of the plurality of beams n times, and received through a second bream of the plurality of beams m times, where n and m are integers greater than or equal to one.

Aspect 30 is a method for wireless communication at a base station, comprising: transmitting a SFN PDSCH through a plurality of beams from a plurality of TRPs including a first TRP and a second TRP, the plurality of beams being based on configured DL TCI states; and receiving a same PUSCH through each of the plurality of beams.

Aspect 31 is a method of wireless communication for implementing any of aspects 1 to 13.

Aspect 32 is an apparatus for wireless communication including means for implementing any of aspects 1 to 13.

Aspect 33 is a computer-readable medium storing computer executable code, where the code when executed by a processor causes the processor to implement any of aspects 1 to 13.

Aspect 34 is a method of wireless communication for implementing any of aspects 26 to 29.

Aspect 35 is an apparatus for wireless communication including means for implementing any of aspects 26 to 29.

Aspect 36 is a computer-readable medium storing computer executable code, where the code when executed by a processor causes the processor to implement any of aspects 26 to 29.

What is claimed is:

1. An apparatus for wireless communication at a user equipment (UE), comprising:
a memory; and
at least one processor coupled to the memory and configured to:
receive a single frequency network (SFN) physical downlink shared channel (PDSCH) through a plurality of beams from a plurality of transmission reception points (TRPs) including a first TRP and a second TRP, the plurality of beams being based on configured downlink (DL) transmission configuration indicator (TCI) states; and
transmit a same physical uplink shared channel (PUSCH) through each of the plurality of beams.

2. The apparatus of claim 1, wherein the same PUSCH is transmitted through each of the plurality of beams through one of time division multiplexing (TDM), frequency division multiplexing (FDM), or spatial division multiplexing (SDM).

3. The apparatus of claim 1, wherein the at least one processor coupled to the memory is further configured to:
receive downlink control information (DCI) indicating a plurality of sounding reference signal (SRS) resource indicators (SRIs) for the PUSCH, a first SRI of the SRIs being associated with at least one of a synchronization signal block (SSB) or reference signals (RS) of the first TRP, a second SRI of the SRIs being associated with at least one of an SSB or RS of the second TRP;
determine, based on the first SRI, a first beam of the plurality of beams based on the first beam being used for receiving the at least one of the SSB or the RS from the first TRP; and
determine, based on the second SRI, a second beam of the plurality of beams based on the second beam being used for receiving the at least one of the SSB or the RS from the second TRP,
wherein the transmission of the same PUSCH is through the first and second beams.

4. The apparatus of claim 1, wherein the at least one processor coupled to the memory is further configured to:
receive downlink control information (DCI) indicating a sounding reference signal (SRS) resource indicator (SRI) for the PUSCH, the SRI being associated with at least one of a synchronization signal block (SSB) or reference signals (RS) of the first TRP and with at least one of an SSB or RS of the second TRP;
determine, based on the SRI, a first beam of the plurality of beams based on the first beam being used for receiving the at least one of the SSB or the RS from the first TRP; and determine, based on the SRI, a second beam of the plurality of beams based on the second beam being used for receiving the at least one of the SSB or the RS from the second TRP,
wherein the transmission of the same PUSCH is through the first and second beams.

5. The apparatus of claim 1, wherein the at least one processor coupled to the memory is further configured to:
determine a plurality of uplink (UL) TCI states, a first TCI state of the TCI states being associated with at least one of a synchronization signal block (SSB) or reference signals (RS) of the first TRP, a second TCI state of the TCI states being associated with at least one of an SSB or RS of the second TRP;
determine, based on the first TCI state, a first beam of the plurality of beams based on the first beam being used for receiving the at least one of the SSB or the RS from the first TRP; and
determine, based on the second TCI state, a second beam of the plurality of beams based on the second beam being used for receiving the at least one of the SSB or the RS from the second TRP,
wherein the transmission of the same PUSCH is through the first and second beams.

6. The apparatus of claim 1, wherein the at least one processor coupled to the memory is further configured to:
receive downlink control information (DCI) indicating a plurality of uplink (UL) TCI states, a first TCI state of the TCI states being associated with at least one of a synchronization signal block (SSB) or reference signals (RS) of the first TRP, a second TCI state of the TCI states being associated with at least one of an SSB or RS of the second TRP;
determine, based on the first TCI state, a first beam of the plurality of beams based on the first beam being used for receiving the at least one of the SSB or the RS from the first TRP; and
determine, based on the second TCI state, a second beam of the plurality of beams based on the second beam being used for receiving the at least one of the SSB or the RS from the second TRP,
wherein the transmission of the same PUSCH is through the first and second beams.

7. The apparatus of claim 1, wherein the same PUSCH is transmitted through each of the plurality of beams with at least one of a different transmit power, a different timing advance, or different redundancy versions.

8. The apparatus of claim 7, wherein the different redundancy versions correspond to at least one repetition of the PUSCH.

9. The apparatus of claim 7, wherein at least one of the different transmit power, the different timing advance, or the different redundancy versions are signaled by a base station associated with one or more of the TRPs.

10. The apparatus of claim 7, wherein at least one of the different transmit power, the different timing advance, or the different redundancy versions are determined by the UE.

11. The apparatus of claim 1, wherein the same PUSCH is transmitted through a first beam of the plurality of beams n times, and transmitted through a second bream of the plurality of beams m times, where n and m are integers greater than or equal to one.

12. The apparatus of claim 1, wherein the at least one processor coupled to the memory is further configured to:
receive downlink control information (DCI) comprising an uplink TCI codepoint that maps to a plurality of uplink (UL) TCI states, a first TCI state of the TCI states being associated with at least one of a synchronization signal block (SSB) or reference signals (RS) of the first TRP, a second TCI state of the TCI states being associated with at least one of an SSB or RS of the second TRP;
determine, based on the first TCI state, a first beam of the plurality of beams based on the first beam being used for receiving the at least one of the SSB or the RS from the first TRP; and
determine, based on the second TCI state, a second beam of the plurality of beams based on the second beam being used for receiving the at least one of the SSB or the RS from the second TRP,
wherein the transmission of the same PUSCH is through the first and second beams.

13. The apparatus of claim 1, wherein the at least one processor coupled to the memory is further configured to:
receive downlink control information (DCI) comprising an uplink TCI codepoint that maps to a plurality of uplink (UL) TCI states, a first TCI state of the TCI states being associated with at least one of a synchronization signal block (SSB) or reference signals (RS) of the first TRP, a second TCI state of the TCI states being associated with at least one of an SSB or RS of the second TRP;
determine, based on the first TCI state, a first beam of the plurality of beams based on the first beam being used for receiving the at least one of the SSB or the RS from the first TRP; and
determine, based on the second TCI state, a second beam of the plurality of beams based on the second beam being used for receiving the at least one of the SSB or the RS from the second TRP,
wherein the transmission of the same PUSCH is through the first and second beams.

14. A method of wireless communication at a user equipment (UE), comprising:
receiving a single frequency network (SFN) physical downlink shared channel (PDSCH) through a plurality of beams from a plurality of transmission reception points (TRPs) including a first TRP and a second TRP, the plurality of beams being based on configured downlink (DL) transmission configuration indicator (TCI) states; and
transmitting a physical uplink shared channel (PUSCH) through each of the plurality of beams.

15. The method of claim 14, wherein the PUSCH is transmitted through each of the plurality of beams through one of time division multiplexing (TDM), frequency division multiplexing (FDM), or spatial division multiplexing (SDM).

16. The method of claim 14, further comprising:
receiving downlink control information (DCI) indicating a plurality of sounding reference signal (SRS) resource indicators (SRIs) for the PUSCH, a first SRI of the SRIs being associated with at least one of a synchronization signal block (SSB) or reference signals (RS) of the first TRP, a second SRI of the SRIs being associated with at least one of an SSB or RS of the second TRP;
determining, based on the first SRI, a first beam of the plurality of beams based on the first beam being used for receiving the at least one of the SSB or the RS from the first TRP; and
determining, based on the second SRI, a second beam of the plurality of beams based on the second beam being used for receiving the at least one of the SSB or the RS from the second TRP, wherein the transmission of the PUSCH is through the first and second beams.

17. The method of claim 16, further comprising:
receiving downlink control information (DCI) indicating a sounding reference signal (SRS) resource indicator (SRI) for the PUSCH, the SRI being associated with at least one of a synchronization signal block (SSB) or reference signals (RS) of the first TRP and with at least one of an SSB or RS of the second TRP;
determining, based on the SRI, a first beam of the plurality of beams based on the first beam being used for receiving the at least one of the SSB or the RS from the first TRP; and
determining, based on the SRI, a second beam of the plurality of beams based on the second beam being used for receiving the at least one of the SSB or the RS from the second TRP,
wherein the transmission of the PUSCH is through the first and second beams.

18. The method of claim 14, further comprising:
determining a plurality of uplink (UL) TCI states, a first TCI state of the TCI states being associated with at least one of a synchronization signal block (SSB) or reference signals (RS) of the first TRP, a second TCI state of the TCI states being associated with at least one of an SSB or RS of the second TRP;
determining, based on the first TCI state, a first beam of the plurality of beams based on the first beam being used for receiving the at least one of the SSB or the RS from the first TRP; and
determining, based on the second TCI state, a second beam of the plurality of beams based on the second beam being used for receiving the at least one of the SSB or the RS from the second TRP,
wherein the transmission of the PUSCH is through the first and second beams.

19. The method of claim 14, further comprising:
receiving downlink control information (DCI) indicating a plurality of uplink (UL) TCI states, a first TCI state of the TCI states being associated with at least one of a synchronization signal block (SSB) or reference signals (RS) of the first TRP, a second TCI state of the TCI states being associated with at least one of an SSB or RS of the second TRP;
determining, based on the first TCI state, a first beam of the plurality of beams based on the first beam being used for receiving the at least one of the SSB or the RS from the first TRP; and
determining, based on the second TCI state, a second beam of the plurality of beams based on the second beam being used for receiving the at least one of the SSB or the RS from the second TRP,
wherein the transmission of the PUSCH is through the first and second beams.

20. The method of claim 14, wherein the PUSCH is transmitted through each of the plurality of beams with at least one of a different transmit power, a different timing advance, or different redundancy versions.

21. The method of claim 20, wherein the different redundancy versions correspond to at least one repetition of the PUSCH.

22. The method of claim 20, wherein at least one of the different transmit power, the different timing advance, or the different redundancy versions are signaled by a base station associated with one or more of the TRPs.

23. The method of claim 20, wherein at least one of the different transmit power, the different timing advance, or the different redundancy versions are determined by the UE.

24. The method of claim 14, wherein the PUSCH is transmitted through a first beam of the plurality of beams n times, and transmitted through a second bream of the plurality of beams m times, where n and m are integers greater than or equal to one.

25. The method of claim 14, further comprising:
receiving downlink control information (DCI) comprising an uplink TCI codepoint that maps to a plurality of uplink (UL) TCI states, a first TCI state of the TCI states being associated with at least one of a synchronization signal block (SSB) or reference signals (RS) of the first TRP, a second TCI state of the TCI states being associated with at least one of an SSB or RS of the second TRP;
determining, based on the first TCI state, a first beam of the plurality of beams based on the first beam being used for receiving the at least one of the SSB or the RS from the first TRP; and
determining, based on the second TCI state, a second beam of the plurality of beams based on the second beam being used for receiving the at least one of the SSB or the RS from the second TRP,
wherein the transmission of the same PUSCH is through the first and second beams.

26. An apparatus for wireless communication at a base station, comprising:
a memory; and
at least one processor coupled to the memory and configured to:
transmit a single frequency network (SFN) physical downlink shared channel (PDSCH) through a plurality of beams from a plurality of transmission reception points (TRPs) including a first TRP and a second TRP, the plurality of beams being based on configured downlink (DL) transmission configuration indicator (TCI) states; and
receive a same physical uplink shared channel (PUSCH) through each of the plurality of beams.

27. The apparatus of claim 26, wherein the same PUSCH is received through each of the plurality of beams through one of time division multiplexing (TDM), frequency division multiplexing (FDM), or spatial division multiplexing (SDM).

28. The apparatus of claim 26, wherein the same PUSCH is received through each of the plurality of beams with at least one of a different transmit power, a different timing advance, or different redundancy versions.

29. The apparatus of claim 26, wherein the same PUSCH is received through a first beam of the plurality of beams n times, and received through a second bream of the plurality of beams m times, where n and m are integers greater than or equal to one.

30. A method for wireless communication at a base station, comprising:
transmitting a single frequency network (SFN) physical downlink shared channel (PDSCH) through a plurality of beams from a plurality of transmission reception points (TRPs) including a first TRP and a second TRP, the plurality of beams being based on configured downlink (DL) transmission configuration indicator (TCI) states; and receiving a same physical uplink shared channel (PUSCH) through each of the plurality of beams.

* * * * *